United States Patent [19]
Brugger et al.

[11] Patent Number: 5,705,744
[45] Date of Patent: Jan. 6, 1998

[54] VEHICLE BRAKE SYSTEM CHECKING METHOD

[75] Inventors: Franz Brugger, Winnenden; Bernd Knoff, Esslingen; Albrecht Eckl, Stuttgart; Hans-Georg Riedel, Pforzheim; Ulrich Stoll, Mannheim, all of Germany

[73] Assignee: Mercedes-Benz AG, Germany

[21] Appl. No.: 595,469

[22] Filed: Feb. 5, 1996

[30] Foreign Application Priority Data

Feb. 3, 1996 [DE] Germany .................. 195 03 451.1

[51] Int. Cl.⁶ .................. G01L 5/28; B60T 17/22
[52] U.S. Cl. .................. 73/121; 73/123; 340/453
[58] Field of Search .................. 73/117, 121, 123, 73/126, 129, 130; 340/453, 454

[56] References Cited

U.S. PATENT DOCUMENTS

| | | | |
|---|---|---|---|
| 3,974,688 | 8/1976 | Cline | 73/126 |
| 3,982,429 | 9/1976 | Cline | 73/126 |
| 3,995,475 | 12/1976 | Cline | 73/126 |
| 4,252,014 | 2/1981 | Ruof | 73/129 |
| 4,520,663 | 6/1985 | Moore et al. | 73/129 |
| 4,567,757 | 2/1986 | Melocik et al. | 73/129 |
| 4,912,969 | 4/1990 | Ishizeki | 73/121 |
| 5,005,405 | 4/1991 | Ishizeki | 73/123 |
| 5,357,800 | 10/1994 | Reuter et al. | 73/121 |
| 5,495,753 | 3/1996 | Watanabe et al. | 73/123 |

FOREIGN PATENT DOCUMENTS 40 28 290 C1   3/1982   Germany .

*Primary Examiner*—George M. Dombroske
*Attorney, Agent, or Firm*—Evenson, McKeown, Edwards & Lenahan, P.L.L.C.

[57] ABSTRACT

A method checks a vehicle brake system rapidly and reproducibly to measure the correlation between the brake pedal travel and the retardation produced. A test-bed routine is called up in the control unit. During the operation of the test-bed routine, the functioning of the brake system is checked. For this purpose, a pressure difference is produced in the vacuum brake booster. The brake booster pressure difference produces a brake pressure in the brake master cylinder, and a pedal travel corresponding to this brake pressure simultaneously arises. The retardation can either be measured at the rollers of the test bed or is derived from continuously measured wheel speed values. A retardation value can be determined for each wheel as can a correlation between the pedal travel and the retardation from the measured values in the presence of different brake booster pressure difference. The process can average the values measured at the individual wheels.

10 Claims, 2 Drawing Sheets

VEHICLE BRAKE SYSTEM CHECKING METHOD

BACKGROUND AND SUMMARY OF THE INVENTION

The present invention relates to a method for checking the brake system of a vehicle, and more particularly, to a method for the brake system having a control unit which is supplied with a signal representing the pedal travel of the brake pedal, and the control unit triggering an automatic braking operation during driving, at least as a function of a variable which is determined from the signal which represents the pedal travel of the brake pedal, a brake pressure being produced during the automatic braking operation.

DE 40 28 290 C1 describes the performance of an automatic braking operation on vehicles when the speed of actuation of the brake pedal exceeds a threshold value. During the automatic braking operation, a brake pressure is produced which is greater than the brake pressure which results from the driver's actuation of the brake pedal. To determine the speed of actuation of the brake pedal, the pedal travel is continuously monitored.

Instead of the brake pedal travel of the pedal, it is also known to measure variables which correlate directly therewith such as, for example, the actuation force of the brake pedal or the diaphragm travel in the brake booster.

It is furthermore conventional practice to check the functioning of vehicle brake systems by, for example, determining the correlation between the brake-pedal travel and the retardation on roller test beds. For this purpose, the retardation is measured at specific pedal travels. To carry out these measurements properly, it is necessary to produce a constant, accurately measurable pedal travel in the vehicle. This is generally done by adjustable gauges which can be introduced into the footwell of the vehicle in a defined position between the driver's seat and the front bulkhead.

The insertion of these gauges is an involved process. They must be secured in a fixed position in the footwell. This generally requires them to have a large volume. Inserting and securing them is time-consuming and can easily lead to damage to the vehicle due, for example, to scratching. It is furthermore necessary to adjust the pedal travel separately for each individual measurement on the vehicle by, for example, appropriate adjustment of the gauge.

It is, therefore, an object of the present invention rapidly and reproducibly to measure in a vehicle a correlation between the brake pedal travel and the retardation produced.

This object has been achieved according to the present invention by providing that the control unit has a callable test-bed routine for test-bed operation to check the brake system, a brake pressure being produced by the control unit during test-bed operation independently of the actuation of the brake pedal, the production of the brake pressure giving rise to a pedal travel of the brake pedal, and this pedal travel of the brake pedal being detected, and in that the retardation achieved on the basis of the brake pressure produced is measured, the characteristic correlation between the brake pedal travel and the retardation being determined in an arithmetic unit from the brake-pedal travel determined in the control unit and the measured retardation.

A test-bed routine is called up in the control unit. It is not, however, the functioning of the control unit which is checked during the operation of the test-bed routine but the functioning of the brake system. For this purpose, a pressure difference is produced in the vacuum brake booster. The brake booster pressure difference produces a brake pressure in the brake master cylinder, and a pedal travel corresponding to this brake pressure simultaneously arises. The retardation can either be measured at the rollers of the test bed or is derived from the continuously measured wheel speed values.

A value for the retardation can be determined for each wheel. Conventional methods can be used to determine the correlation between the pedal travel and the retardation from the measured values in the presence of different pressure differences in the brake booster. This can be performed separately for each wheel, the values measured at the individual wheels can also be averaged.

The correlation determined which consists, for example, in an approximation curve, is compared with a desired correlation specific to the brake system. Faults in the functioning of the brake system can be inferred in a conventional manner on the basis of the deviation determined. The term "faults" is here used to denote, for example, an incorrect pressure build-up in the wheel brake cylinders or insufficient frictional engagement between the brake lining and the brake disk.

It is within the contemplation of the present invention to input a specific sequence of pressure differences or directly to input a specific sequence of specified pedal travels in succession.

According to a further aspect of the present invention, the engine speed is controllable in the vehicle so that, at least when needed, a sufficient vacuum is produced in the intake pipe or at the outlet of the vacuum pump by, for example, appropriate driving of the engine control system.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
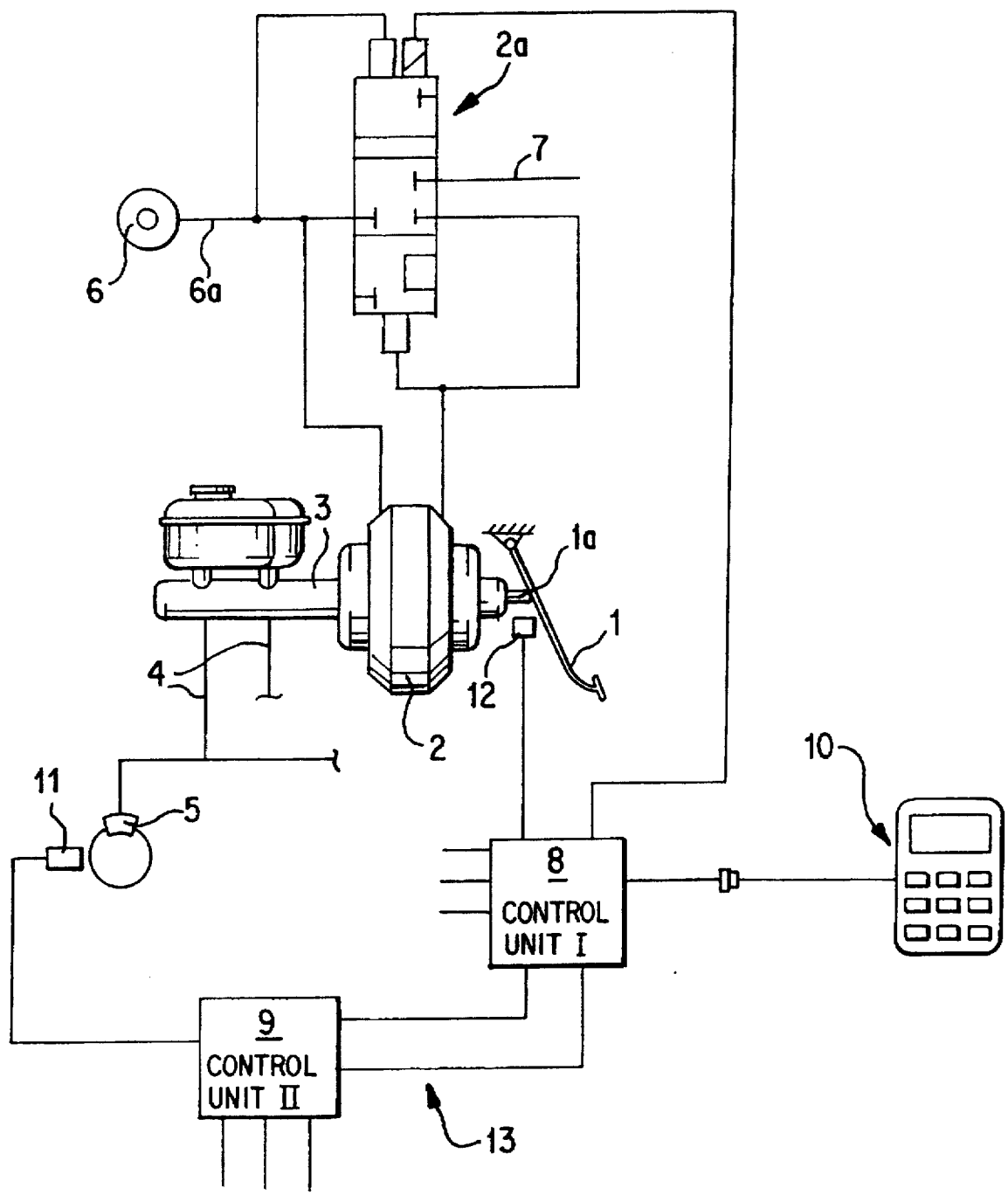
FIG. 1 is a schematic representation of a brake system suitable for carrying out the method according to the present invention.

The vehicle brake system shown in FIG. 1 illustrates only one wheel brake cylinder 5. The control unit 8, via which the automatic braking operation is controlled during driving, is connected to a control and display unit 10 outside the vehicle. This control unit 10 can be used to call up the test-bed routine in the control unit 8. During execution, data which determine the course of the testing operation can be input. The wheel speeds measured in the wheel-speed sensors 11 of the wheels are evaluated in the further control unit 9. The conditioned measured values are passed via the data line 13 to control unit 8.

Control unit 8 is furthermore connected to the pedal-travel sensor 12 and to the control valve 2a, which can be driven electrically thereby, of the brake booster 2. The control valve 2a is generally arranged within the housing of the brake booster 2. During normal driving, the valve position is produced by the applied pedal force and the pressure difference ΔP between the conventionally configured chambers (not shown) of the brake booster. The control valve 2a controls both the fluid connection between the pedal-side operating chamber and the vacuum source 6, for example, the intake pipe of the engine via the intake line 6a, and the fluid connection to the atmosphere via the pressure inlet 7. The electrical control of the control valve 2a is capable of overriding the valve position established by the pressure difference ΔP between the brake booster chambers. During this process, the pedal-travel sensor 12 detects the distance travelled by the pedal 1 or the brake linkage 1a.

An external vacuum source can be employed instead of the intake pipe. This external source has the advantage that it is not absolutely necessary for the engine of the vehicle to be operating. In addition, an external vacuum source makes it easier to measure the vacuum produced and applied to the brake booster 2 and therefore to determine the maximum force applied by the brake booster.

The brake master cylinder 3 directly adjoins the brake booster 2. The brake pressure produced in the brake master cylinder 3 is passed via the main brake lines 4 to the wheel brake cylinders 5, one of which is shown.

Figure 2:
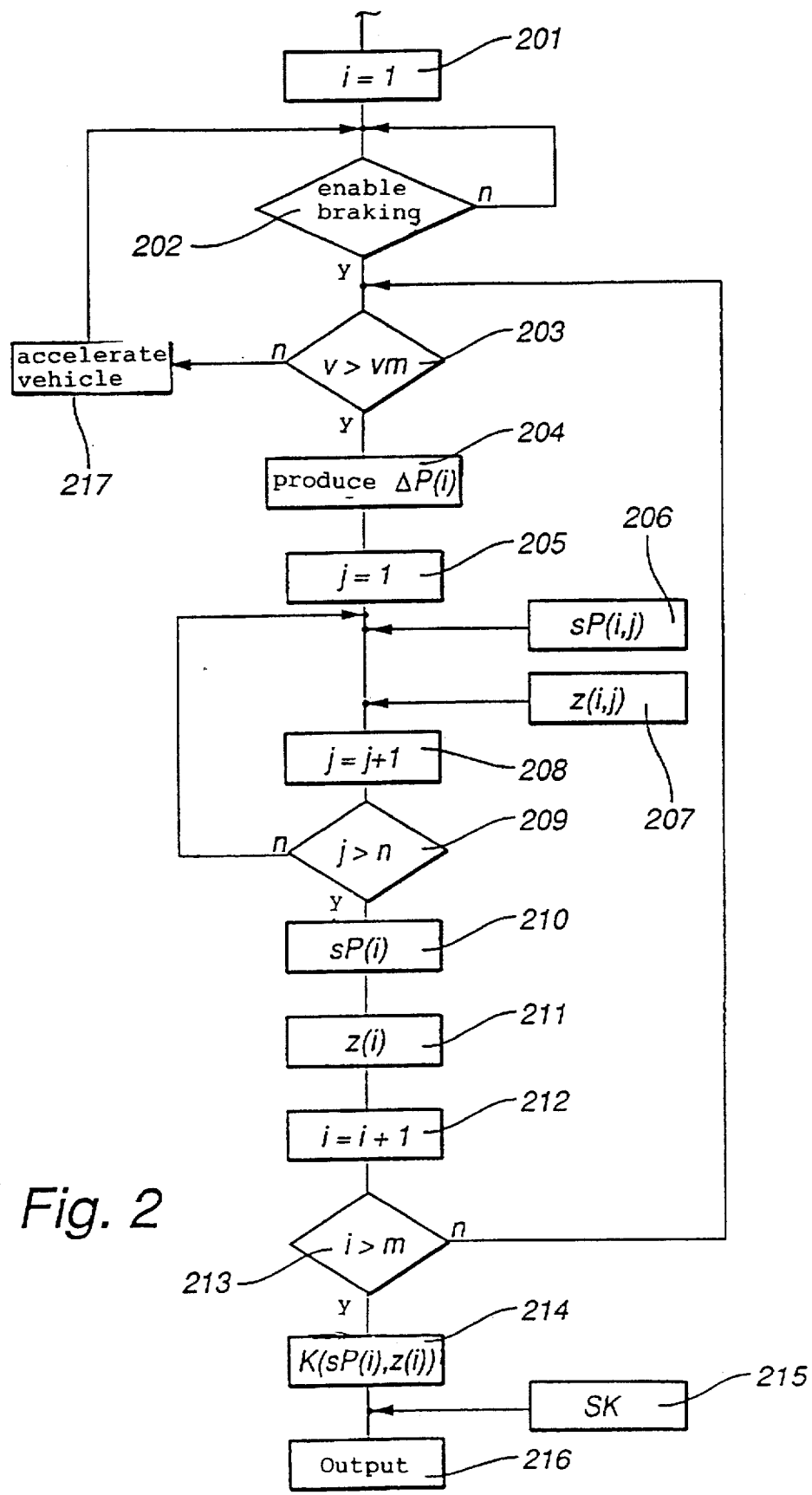
FIG. 2 is a flow diagram of the method according to the present invention.

FIG. 2 shows an embodiment of the steps of a method according to the present invention. In particular, the pressure difference ΔP is produced so that a specific pedal travel is produced. Once this pedal travel has been reached, the actual measurement is carried out. In the description which now follows, it would therefore be more accurate to interpret the term "production of a pressure difference" as meaning the production of a specified pedal travel, because the pedal travel is also detected in the course of the measurements. As an alternative, the pressure difference between the chambers of the brake booster can be measured. However, this would require additional sensors in the vehicle and would thus increase costs.

In the text notations which follow, the count parameters i, j are appended in parentheses to the letters designating the variables in order to identify an individual measurement result. A measurement result which has only one counter parameter is the average of the values measured for this count parameter in all the counting passes of the other parameter.

At the beginning of the test routine, the counter i is reset to 1 in step 201. The counter i here represents the various pressure differences ΔP(i) which are fed in. The counter j stands for the measurements which are carried out for each pressure difference ΔP(i). The number of pressure differences m at which a measurement is carried out, the pedal travels at which the measurement is carried out, and the number of measurements for each pressure difference ΔP(i) can be influenced, for example, by the input unit 10.

In step 202, the system then checks whether an enable for a braking operation, to be input at the input unit 10, has taken place. The enable provides an opportunity to produce an initial rolling speed of the wheels on the rollers of the test bed. As soon as this occurs, the system checks in step 203 whether the current speed v of the wheels, which can be derived from the wheel speeds, is greater than a minimum value vm which ensures that a sufficient number of measurements is possible, at least for one pressure difference ΔP(i). If this is not the case, the sequence is interrupted and, in accordance with step 204, a request is issued to increase the wheel speed accordingly. The system then loops back to step 202.

If the speed v is sufficient, then, in step 204, the pressure difference ΔP(i) is fed in, producing a specified pedal travel of the brake pedal 1. As soon as the brake pressure has been fed in, it is held constant. In step 205, the counter j for the individual measurements at this pressure difference ΔP(i) is reset to "1". In step 206, the pedal travel sP(ij) and, in step 207, the retardation z(ij) produced are determined and stored. In step 208, the counter j is incremented and, in step 209, the system checks whether the number n of measurements to be carried out at the pressure difference ΔP(i) has been carried out. If this is not the case, the system loops back to step 206.

Otherwise, in step 210 and step 211 respectively, the average pedal travel sP(i) and average retardation z(i) are calculated and stored. The evaluation will be carried out on the basis of these averages. In step 212, the counter i is incremented. In step 213, the system checks whether the counter i has exceeded the number of measurements to be carried out at different pressure differences ΔP(i). If this is not the case, the system loops back to step 203.

Otherwise, in step 214, the correlation K between the measured pedal travels sP(i) and the measured retardations z(i) is determined. The correlation can, for example, be the slope of a straight line, which can be determined from the measured values by the known method of least squares. It is also possible, however, to use other determination methods or other assumed relations between the measured values. This correlation K is compared with the desired correlation supplied in step 215 which corresponds to a brake system which is functioning normally, and is output in step 216 via, for example, the input and output unit 10. This concludes the test routine.

Because this method is so simple to carry out, it can not only be used in workshops but also makes end-of-line checking during vehicle assembly considerably easier.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for use in a vehicle having a brake system in which a control unit which triggers automatic braking operation during driving has a callable test-bed routine for test-bed operation for checking the brake system and is supplied with a signal representative of brake pedal travel, comprising the steps producing, via the control unit, a brake pressure during test-bed operation independently of brake pedal actuation, thereby giving rise to the brake pedal travel; detecting the brake pedal travel; measuring the retardation achieved on the basis of the produced brake pressure; and computing in an arithmetic unit a characteristic correlation between the brake pedal travel and the retardation from the brake-pedal travel determined in the control unit and the measured retardation.

2. The method according to claim 1, further comprising the step of performing a predeterminable sequence of actuations with brake pressures.

3. The method according to claim 1, further comprising the step of performing a predeterminable sequence of actuations with specified pedal travel.

4. The method according to claim 1, wherein the step of producing the brake pressure comprises a build-up of pressure difference between brake booster chambers.

5. The method according to claim 4, further comprising the step of performing a predeterminable sequence of actuations with brake pressures.

6. The method according to claim 4, further comprising the step of performing a predeterminable sequence of actuations with specified pedal travel.

7. The method according to claim 1, further comprising the steps of comparing the characteristic correlation with a desired correlation specific to the brake system, and inferring faults in the brake system from deviations between the characteristic correlation and the desired correlation.

8. The method according to claim 1, wherein the step of producing the brake pressure comprises building-up a pressure difference between brake booster chambers, the building-up being controlled by the control unit.

9. The method according to claim 8, further comprising the step of measuring the pedal travel by determining travel of a diaphragm separating working chambers of the brake booster.

10. The method according to claim 1, wherein each braked wheel is retarded separately, the retardation being derived from the measured values of the wheel speed of the respective braked wheel.

* * * * *